United States Patent [19]
Towne

[11] Patent Number: 5,452,670
[45] Date of Patent: Sep. 26, 1995

[54] WASTE RECYCLING SYSTEM

[76] Inventor: Gary A. Towne, Box 413, Mancos, Colo. 81328

[21] Appl. No.: 136,678

[22] Filed: Oct. 15, 1993

[51] Int. Cl.⁶ .................................................. F23G 5/12
[52] U.S. Cl. ........................ 110/346; 110/229; 110/257
[58] Field of Search ................................ 110/229, 235, 110/255, 257, 259, 185, 186, 341, 346; 48/203, 113

[56] References Cited

U.S. PATENT DOCUMENTS

| | | | |
|---|---|---|---|
| 4,231,302 | 11/1980 | Linneborn | 110/229 |
| 4,561,363 | 12/1985 | Mallek | 110/229 |
| 4,613,408 | 9/1986 | Howard. | |
| 4,648,328 | 3/1987 | Keough. | |
| 4,846,082 | 7/1989 | Marangoni. | |
| 4,895,083 | 1/1990 | McDilda. | |
| 5,101,739 | 4/1992 | Nance et al.. | |
| 5,213,051 | 5/1993 | Kaneko | 110/229 |

FOREIGN PATENT DOCUMENTS 5565820  5/1980  Japan.

*Primary Examiner*—Denise L. Gromada
*Attorney, Agent, or Firm*—Knobbe, Martens, Olson & Bear

[57] ABSTRACT

A waste recycling system which separates the reusable components within waste such as tires by incomplete burning followed by a series of separation steps. The incomplete burning is carried out within a chamber having at least two hollow perforated rollers on which the waste is supported. The tires are ignited and caused to smolder within the chamber, allowing gaseous and vapor by-products to be released and travel downward into the rollers. Inorganic solid matter remaining from the combustion process continuously falls between the slowly rotating rollers into a removal bin or conveyor. The gaseous combustion by-products are directed through an oil bath filter having a mesh on which sprayers apply a cooling oil mist to capture the oil vapor. The remaining hydrocarbon emissions are burned incompletely, and the resulting carbon black within the effluent filtered out. The effluent is then completely combusted generating heat and then scrubbed to emit a relatively clean gaseous discharge.

26 Claims, 7 Drawing Sheets

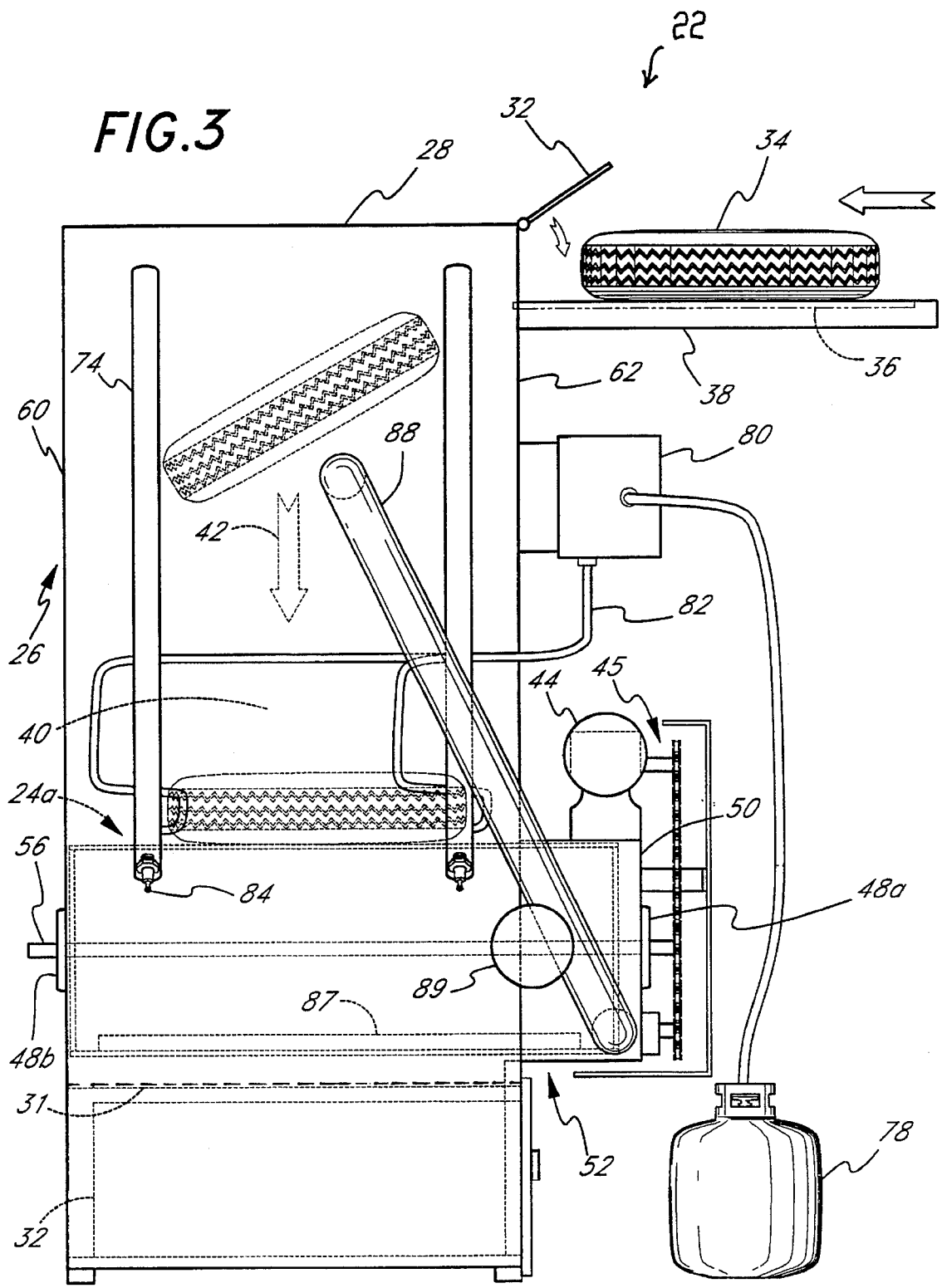

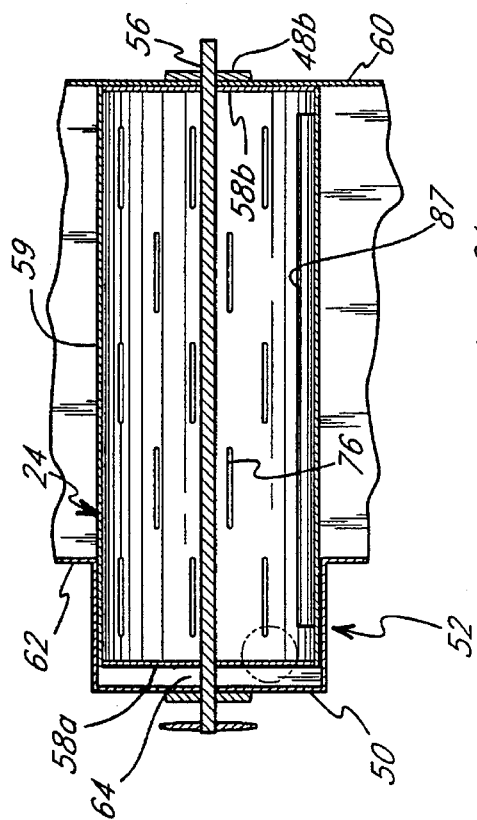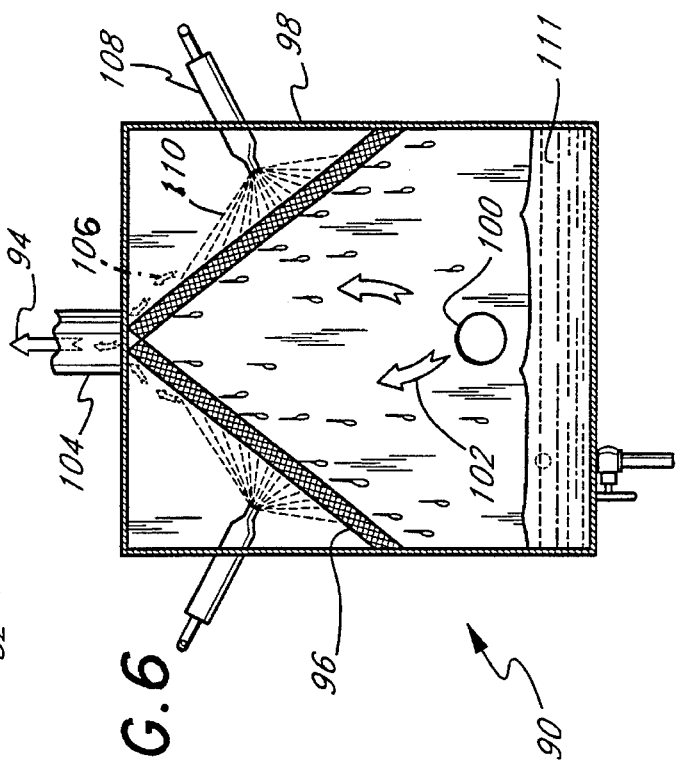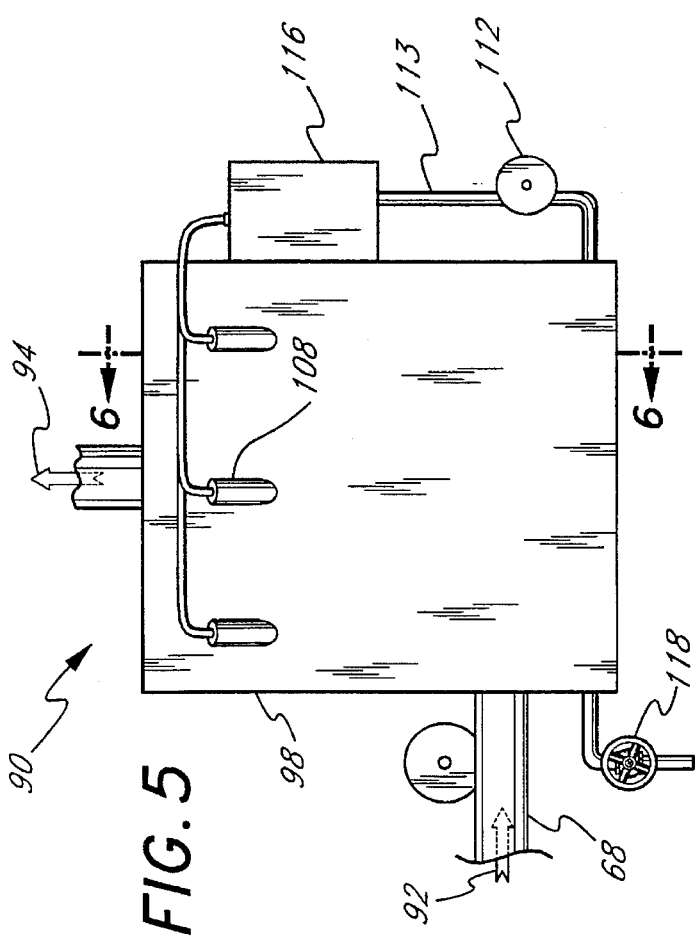

WASTE RECYCLING SYSTEM

FIELD OF THE INVENTION

The present invention relates generally to a system for recycling waste, such as used tires and, more particularly, to a system for separating and reclaiming the usable components within the tires.

BACKGROUND OF THE INVENTION

The problem of how to dispose of used vehicle tires has for many years been a major environmental concern. In particular, the U.S., as the major world consumer of automobiles and trucks, discards millions of worn-out tires every year. As an economical disposal method has not been found to date, huge unsightly piles of used tires are commonplace. These large piles of tires present a significant fire hazard, as the tires readily ignite and continue to burn without assistance. Furthermore, large piles of discarded tires present a serious health endangerment threat, as standing pools of water within the tires provide ideal breeding grounds for disease-carrying mosquitos.

A significant amount of research has been done to try to solve the problem of disposing of used tires. Governments, such as in the U.S., have for some time applied a levy on the disposal of tires in order to sponsor such research. One process involves reclaiming the rubber from within the tires by the treatment of ground vulcanized scrap tires and other miscellaneous rubber articles with heat and chemical agents. Broadly, the reclaiming process involves first grinding the scrap rubber, then applying a heat treatment for depolymerization and finally processing with intensive friction milling. Unfortunately, this reclamation process is relatively expenses per tire and thus has not seen large scale implementation.

In U.S. Pat. No. 4,648,328 to Keough, a process in which used tires are subjected to a destructive distillation inside a pyrolysis chamber is shown. First, the tire fragments are shredded and then the tire is subjected to temperatures between 800° and 1600° F. in an oxygen-free atmosphere. The gaseous by-products are removed and oil separated therefrom while the solid components are directed to a series of devices for separating the steel, glass fibers, and carbon black. Another effort at disposing of used tires utilizing a destructive distillation device is shown in U.S. Pat. No. 4,613,408 to Howard.

A more cost effective means for disposing of used tires has been incineration to produce energy. Two examples of these efforts are shown in U.S. Pat. No. 4,846,082 to Marangoni, and Japanese Patent No. 55-65820 to Noboru. U.S. Pat. No. 5,101,739 to Nance, et al., discloses burning tires at relatively low heat to produce usable fuel gas. A tire disposal system which utilizes the heat generated from initial combustion in a co-generation facility is shown in U.S. Pat. No. 4,895,083 to McDilda. In this system, the optimum burning temperature is between 2300° and 2500° F. The emissions from the combustion travel through a tortuous series of baffles and filters to capture any carbon black therein. A drawback of this system is the high energy input required to completely combust the tires. Moreover, environmental pollution standards have become increasingly stringent, mandating the addition of more effective effluent gas filters or scrubbers.

In general, because of the high cost of pollution reduction equipment, in combination with the relatively low BTU content of the used tires, incineration to produce usable heat has only proved economically viable when implemented on a large scale in areas where a steady stream of tires is guaranteed, such as proximate urban centers. Unfortunately, there is significant resistance to construction of such tire burning plants near densely populated areas. Further, there has been a problem with some systems which burn tires in an incomplete combustion reaction to obtain fuel gas. Specifically, the amount of contaminants in the fuel gas leads to serious compressor clogging and buildup of sludge in containment tanks or bladders.

Thus, there has been a need for a more efficient, clean and cost effective system for disposing of used tires.

SUMMARY OF THE INVENTION

In response to problems associated with incinerating tires to produce waste heat, the present invention provides a system for separating and reclaiming the components within tires, as well as other similar organic materials. The system generally comprises a number of discreet devices connected in series for separating the usable components of the tires rather than simply incinerating the tires to extract the heat energy therein. Initially, the tires are deposited within a burn chamber and subjected an incomplete combustion reaction. The by-products of this incomplete combustion are substantially all of the hydrocarbons and the oil within the tire in the form of airborne gas or vapor, and assorted solid inorganic matter. Hereinafter, the term "gaseous" by-products will be used to describe the mixture of gaseous hydrocarbons and oil vapor produced as by-products of the incomplete combustion reaction within the burn chamber.

The gaseous by-products are directed into an oil bath filter where the oil vapor is condensed and separated from the hydrocarbon gases. The hydrocarbon gases pass through the oil bath filter and are directed into a first combustion chamber. An incomplete combustion or carbonization occurs within the first chamber to produce a thick, black smoke, heavy in carbon. The carbon molecules, or carbon black, are filtered from the exhaust and collected for resale or reuse. Heat is also a by-product of this combustion process and may be captured as well. After filtering the carbon black, the remaining hydrocarbons are directed into a second combustion chamber. Complete combustion is the goal in the secondary combustion chamber, with the addition of air and/or fuel possible to assist the incineration. The heat generated in the secondary combustion chamber is captured and reused, while the emissions are channeled through a carbon dioxide scrubber. Due to the prior separation of the oil and carbon black from the gaseous by-products out of the burn chamber, the emissions from the scrubber are relatively clean and preferably do not require further pollution treatment.

In accordance with a preferred embodiment of the present invention, the burn chamber comprises a nominally airtight enclosure having an upper air lock entrance for inputting tires. The tires fall onto at least two large rollers in the lower portion of the burn chamber. The rollers have a hollow cylindrical construction with a plurality of perforations or slits in the outer wall. One end face of the rollers extends out of the burn chamber and into an enclosed sub-chamber having a vacuum port extending therefrom. The tires are ignited and allowed to slowly burn or smolder on top of the rollers while air is pulled through the slits in the rollers into the sub-chamber through one or more large gas apertures in front end plates. Air enters the burn chamber through the airlock, which is constructed with loose tolerances and thus is only nominally airtight. As the tires smolder, the organic materials contained therein are converted to gases or vapor and drawn through the slits and into the vacuum subchamber. Sulfur is released from the rubber compounds of the tire and accumulates on the steel wires, which are typically embedded in the rubber of the tire. The sulfur coated steel and some clay by-products of the tire remain in the burn chamber and are dropped between the rollers onto a solid waste repository.

The gaseous by-products of the incomplete combustion within the burn chamber pass from the vacuum sub-chamber through a conduit into a mid-portion of an oil bath filter. The oil bath filter generally comprises an outer housing with an oil mesh or screen mounted across a mid-portion of the housing above the conduit inlet from the burn chamber. The gaseous by-products pass through the oil screen and out an upper exit conduit. A plurality of spray nozzles apply a cooling oil mist to the upper surface of the oil screen, causing the screen to be cooled and wetted in order to trap oil vapor carried along with the gaseous by-products. The oil vapor thus condenses on the oil screen and either drips directly down or along the housing walls into a lower reservoir. Preferably, the oil recovered from the gaseous by-products is reused as the cooling oil mist, after passing through an external heat exchanger.

In one preferred embodiment, a multiple roller burn chamber is provided to more efficiently decompose the tires with heat and carry away the by-products. The multiple roller burn chamber comprises an elongated housing with the rollers positioned side-by-side and relatively close together, except for two rollers located at the opposite end of the chamber from a tire input airlock. From the airlock end, the rollers rotate in the same direction to gradually feed the decomposing tires through the chamber toward an outlet end. At the outlet end, a space between the last two rollers allows the noncombusted solid waste to continuously drop through onto a conveyor. The last roller rotates in the opposite direction from the others to urge this solid matter downward through this space. The conveyor underneath the rollers transports solid matter out of the burn chamber through a secondary airlock. In this manner, solid waste may be removed from the burn chamber without halting the burn. Each of the rollers includes one or more vacuum ports in one of their end faces, the ports communicating with a vacuum sub-chamber having a vacuum conduit leading therefrom. Air is pulled in through a series of tubes opening into the ceiling of the burn chamber, the tubes drawing air from the input airlock. The rollers have a hollow cylindrical construction with a plurality of slits in their outer surfaces through which gaseous emissions from the incomplete combustion are drawn.

BRIEF DESCRIPTION OF THE DRAWINGS

FIG. 3 is a side elevational view of the burn chamber of FIG. 2;

FIG. 4 is a cross-sectional view of a cylindrical roller utilized in the burn chamber of the present invention;

FIG. 5 is a front elevational view of an oil bath filter utilized in the present invention;

FIG. 6 is a cross-sectional view of the oil bath filter taking along line 6—6 of FIG. 5;

DESCRIPTION OF THE PREFERRED EMBODIMENTS

Figure 1:
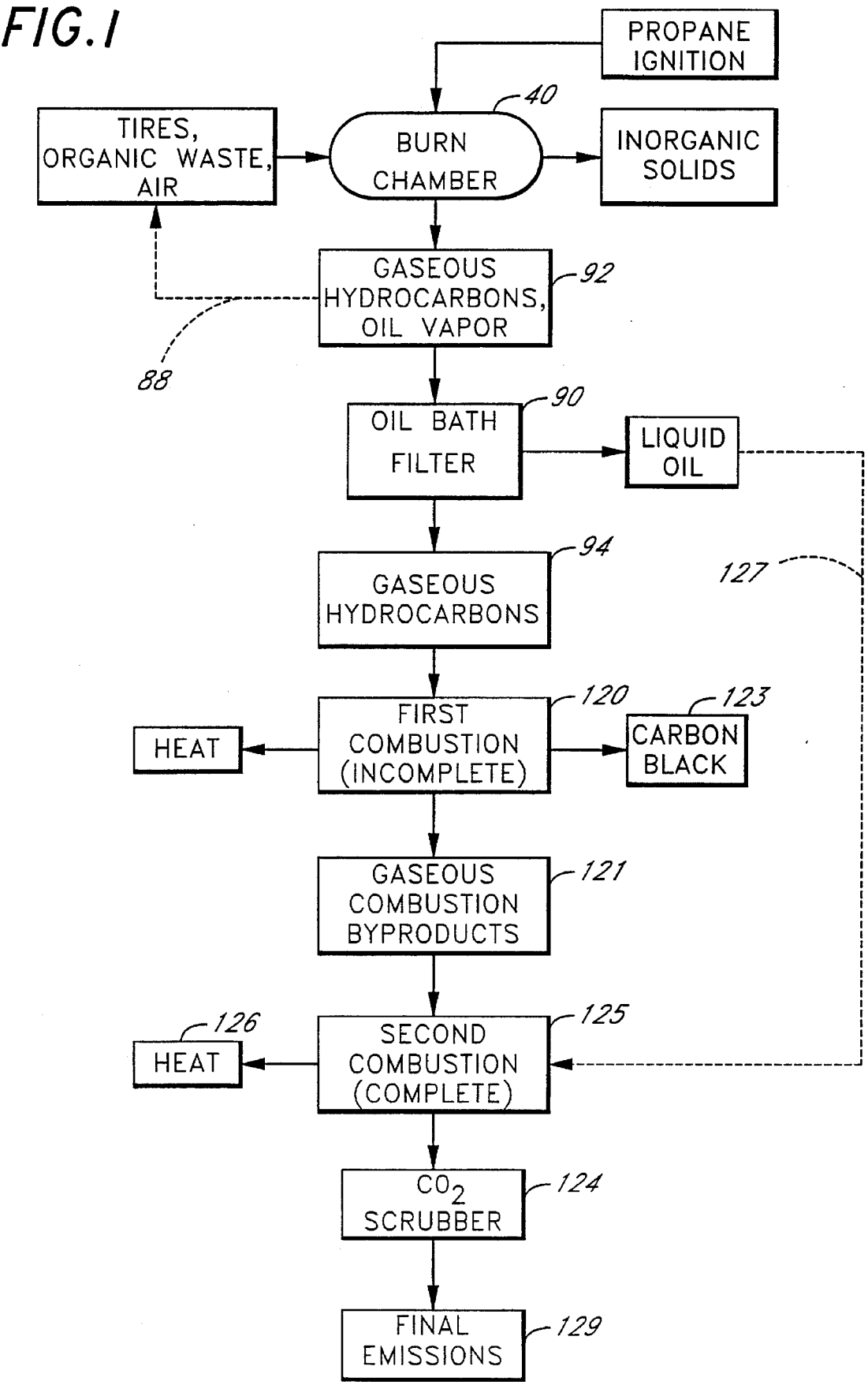
FIG. 1 is a flow chart showing the general steps in the tire recycling system of the present invention.
Figure 2:
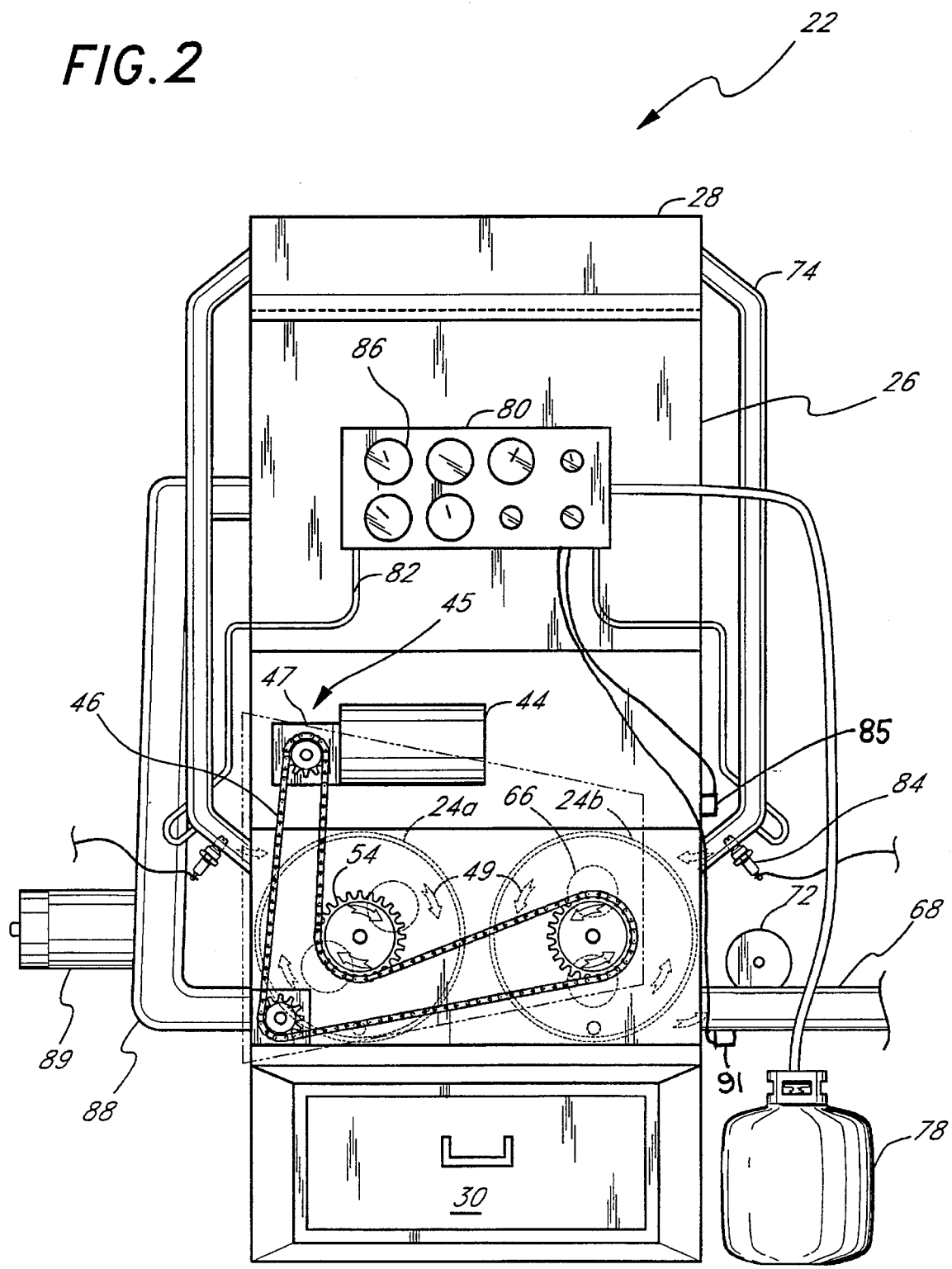
FIG. 2 is a front elevational view of one embodiment of a burn chamber of the present invention.

As shown in FIGS. 1–3, the tire recycling system 20 begins in a burn unit 22. The burn unit 22 shown in FIGS. 2 and 3 is a relatively small scale unit having two hollow perforated rollers 24a, 24b. A larger scale multiple roller burn chamber, described with reference to FIGS. 7–9, may be substituted in the flow chart of FIG. 1 for the double-roller burn unit 22.

The burn unit 22 generally comprises an outer housing 26 constructed of suitable temperature-resistant steel or other material. The housing 26 is a generally upright rectangular structure having an airlock 28 at the upper end and a solid waste removal bin 30 at the lower end fitted with an air-lock plate 31. A swinging trap door 32 allows tires 34 to be inserted into the airlock 28. The tires 34 rest on a slider plate 36 arranged to reciprocate in and out along a track (not shown) from a position forming a floor inside the airlock to a retracted position outside of the airlock supported by an extension frame 38. With the trap door 32 open, the slider plate 36 is in an inward position, allowing the tires to be inserted and rest thereon within the airlock 28. Thereafter, the trap door 32 is closed and the slider plate retracted into the frame 38, as seen in FIG. 3, allowing the tire to drop into a burn chamber 40, as indicated by the arrow 42.

The horizontally disposed rollers 24a,b support the tires 34 and are rotatably driven by a motor 44 and chain drive 45 including chain 46 and gear box 47. The direction of rotation of the rollers 24 are shown at 49. The rollers 24a,b are supported at either end by a pair of bearings 48a, 48b. The front bearing 48a is mounted to a front side 50 of a vacuum sub-chamber 52 while the rear bearing 48b is mounted to a rear panel 60 of the housing 26. Sprockets 54 are keyed or otherwise rotationally fixed to forwardly extending portions of central shafts 56 of the rollers 24a,b.

With specific reference to FIG. 4, the shafts 56 are welded or otherwise affixed to central apertures in front and rear end plates 58a, 58b, respectively, of the rollers 24. The end plate 58a,b are likewise welded to the inner surface of roller outer cylinders 59. The rear end plate 58b comprises a solid disk and lies flush with an inner surface of the rear panel 60 of the housing 26. The front end of each roller 24 extends through an enlarged aperture in a front wall 62 of the housing 26 and into the vacuum sub-chamber 52. The front end plate 58a terminates a short distance from the front wall 50 of the sub-chamber 52 to form a vacuum space 64. As seen in phantom lines in FIG. 2, the front end plate 58a on each roller includes at least one, and preferably two diametrically opposed circular apertures or ports 66 providing communication between the vacuum space 64 and the interiors of the rollers 24. A vacuum conduit 68 communicates with the vacuum space 64 through a side aperture of the sub-chamber 52 and incorporates a blower 72 along its length for generating a reduced pressure in the conduit on the side of the blower nearest the burn unit 22.

The burn unit 22 functions as an incomplete combustion chamber for the tires and has a preferred air flow pattern which ensures uniform low temperature burning. The air flow pattern generally follows a path beginning at the airlock 28, through the chamber 40, into the rollers 24a,b and eventually out through the exhaust conduit 68 under influence of a pressure gradient generated by the blower 72. A pair of intake tubes 74 on either side of the burn unit 22 extends from the side walls of the airlock 28 downward to a position on the side walls of the burn unit 22 proximate the rollers 24. The cylindrical side wall 59 of each roller 24 includes a plurality of perforations or slits 76, as seen in FIG. 4. The slits 76 may be cut into the rollers using a plasma torch or other suitable cutting implement. Although longitudinal slits 76 are shown, other apertures may be substituted to provide fluid communication through the roller wall 59. Actuation of the blower 72 creates a reduced pressure within the conduit and vacuum space 64 which also creates a reduced pressure within the rollers 24a,b due to the ports 66 in the front end plates 58a. Air and gaseous combustion by-products are pulled from the burn chamber 40 through the slits 76 into the interior of the rollers 24. In turn, the air for the combustion process is pulled into the region proximate the burning tires through the intake tube 74; thus any fugitive combustion gases which leak into the airlock 28 from chamber 40 are preferably sucked back into the combustion area to be re-burned.

In one embodiment, the burn unit housing 26 is approximately seven feet tall, three feet wide, 30 inches deep and constructed of 5/16" sheet metal. The vacuum sub-chamber 52 forms a rectangular box extending 6 inches forward of the housing 26. The rollers are preferably 16 inch diameter, 1 inch thick pipe having a length of 34 inches. The end plates 58 are ½ inch thick with the front plate having two 4 inch diameter gas ports 66. The central shaft 56 of each roller is 44 inches long and 1-½ inch thick solid rod. The slits 76 are preferably ⅜" wide by 4 inches long and are disposed around the cylinder 59 in a manner to maximize air flow uniformity without compromising the required bending strength of the rollers 24.

Initially, the tires are ignited utilizing a propane ignition system. The propane ignition system generally comprises a supply of propane, such as tank 78, providing propane gas to a metering device (not shown) within a control panel 80 on the front side of the burn unit 22. One or more, preferably four, output lines 82 from the metering device communicate with a lower portion of the intake tubes 74. Propane gas can thus be injected into the intake tubes 74 proximate the lower entrance into the burn chamber 40. Spark plugs 84, or other sparking ignition device, are mounted to the intake tubes 74 just prior to the entrance into the burn chamber 40. At the start-up of a tire disposal operation, propane gas is fed into the burn chamber and ignited by the spark plugs 84 in order to catch the tires on fire.

Once the tires have caught fire they generally burn without further propane injection. Preferably, the tires smolder at a relatively low temperature in order to undergo partial combustion, or the decomposition of the tire components by heat. The tires smolder at the low temperature, generating gaseous by-products which substantially comprise gaseous hydrocarbons, from the various rubbers used in tires, and oil in vapor form. The gaseous by-products are thus drawn into the interior of the rollers 24a,b, out the end plates 58a, and into the vacuum conduit 68. The remaining portion of the tires is generally composed of wires, such as in steel belted tires, and includes clay, zinc and sulfur, which are added to the rubber during manufacture of the tire.

The inorganic waste matter, comprised of tangled wires and other matter, drops down between the rotating rollers 24a,b into the removal bin 30. Some particulate matter may drop into the roller cylinders 59 through the slits 76. To eliminate buildup, a grinder bar 87 placed freely within the rollers 24 continuously rolls over the lower slits 76 forcing matter out of the rollers and down to the solid waste bin 30. In this respect, the motor 44 is preferably a stepper motor, which causes the rollers 24a,b to rotate in steps at a very low speed. For example, the rollers may travel as slow as one revolution per hour. The roller rotation facilitates the continual removal of the inert solid combustion by-products from the combustion area, which could also be accomplished with agitation or other motion. Although having two rollers spaced across a gap works best, it is also feasible to provide more than one such pair or, alternatively, only one roller positioned so that the solid combustion by-product eventually drops between the roller and at least one wall of the burn unit.

After the bin 30 fills up, the air lock plate 31, normally retracted from the unit 22, can be slid into the position shown in FIG. 3 under the rollers 24, and the bin pulled out and emptied. This "air lock" feature at the solid waste removal bin 30 limits the amount of noxious fumes escaping from the unit 22. Further, and more importantly, such an arrangement prevents the potentially explosive sudden ingress of a large quantity of air into the combustion chamber 40 and thus allows the simultaneous burning operation and solid waste removal. Other configurations for this continual solid waste removal are possible, such as an automated bin retraction system or conveyor assembly.

The zinc and sulfur decompose from the other components of the tire and tend to accumulate on the wires due to a chemical reaction catalyzed by the high temperature. Advantageously, the improved gas flow pattern from the smoldering tires vents the gaseous by-products directly downward into the slits 76 and out of the burn chamber 40 and decreases the accumulation of oil on the wires thus increasing the deposition of zinc and sulfur on the wires instead. This "downdraft" burn configuration thus facilitates the removal of zinc and sulfur from the gaseous emissions of the burn chamber 40 eliminating the formation of potentially noxious fumes, such as sulfur dioxide, created by these chemicals. Beneficially, scrubbing equipment to remove these noxious gases is no longer necessary. Additionally, the oil vapor is quickly removed downward without condensing on the inner surfaces of the burn chamber 40 itself thus extending the usable life of the unit 22 which is difficult to clean.

Desirably, the combustion process is held to an approximate temperature range of between 500–600° F. Sensors, such as pyrometers, herein depicted schematically at 85, are placed at strategic locations around the burn chamber 40 in order to monitor the combustion temperature or gas composition. The sensors preferably communicate with gauges within the control panel 80, the gauges having indicators such as analog or digital readouts 86. The present system preferably incorporates a burn temperature feedback loop to maintain the burn temperature to within a predetermined range. At excessive temperatures, the blower 72 speed is increased increasing the air flow through the combustion chamber. Conversely, the blower 72 may be slowed down or shut off if the burn temperature gets too hot. Conventional temperature dependent circuitry may be utilized in this respect.

An important aspect of the present invention is the ability to control the BTU content of the exhaust gaseous by-products. First, as mentioned above, adjustments to the blower 72 speed maintain the burn within a preferred range. Secondly, the improved tire support provided by the rollers 24 enhances the air flow uniformity. Furthermore, charred or otherwise combusted matter is continuously dropped through the rollers in order to maintain a consistent supply of unburned tire material in the chamber burn region. Also in that respect, the roller speed may be adjusted to carry away the solid refuse faster. Indeed, the versatility of the present burn unit 22 allows an operator to compensate for various tire compositions.

An additional feature of the burn unit 22 is the capacity to recycle the gaseous by-products through the burn chamber 40 to increase the energy content of the resultant emissions. To accomplish this, a concentrator path comprises a return conduit 88 and a variable speed in-line blower 89. Sampling of the gaseous by-products, such as oxygen sampling utilizing oxygen concentration sensors as depicted schematically at 91, from the burn chamber 40 provides an indication of the chemical makeup and energy content. A reduced energy content may trigger the blower 89 to draw fumes from within the vacuum sub-chamber 52 and channel them back into the burn chamber 40 above the smoldering tires. This will reduce the proportion of fresh air in the combustion process and simultaneously increase the hydrocarbon concentration in the gaseous by-products until the energy content reaches a desired level. The concentrator path eventually produces a steady-state combustion mix and serves to agitate the mix to further enhance gas uniformity within the chamber 40. A reduced energy content may be caused by varying tire compositions or from less than optimum burn conditions. Also, the slits 76 extend around the entire circumference of the rollers 24 and thus draw in gas from the combustion process above as well as from below which tends to dilute the concentration of gaseous combustion by-products in the effluent. The concentrator loop essentially dilutes the oxygen content of the gas in the chamber 40. Of course, the main blower 72 can be adjusted concurrently to increase the overall gas flow through the system. Again, this feedback loop utilizes conventional circuitry and may in fact be automated. Furthermore, the control of the blower 72 may be dependent on other sensors such as pyrometers located in the exhaust conduit 68 or further downstream. For instance, a pyrometer may be placed within a primary combustion chamber 120 (FIG. 1) for this purpose.

Now referring to FIGS. 5 and 6, the exhaust conduit 68 terminates at an oil condenser or oil bath filter 90. Generally speaking, the oil bath filter 90 removes the oil vapor from the entering gaseous by-products 92 so that emissions 94 are substantially comprised of hydrocarbons. The oil bath filter 90 functions by passing the gaseous by-products 92 through an intermediate screen or mesh 96, which is mounted across the housing 98. As shown in FIG. 6, the gaseous by-products 92 enter the interior of the oil bath filter 90 through an aperture 100 and travel upward, as indicated by arrows 102, toward the mesh 96. After passing through the mesh 96, the hydrocarbon emissions 94 escape through an upper conduit or flue 104, as shown by small arrows 106. In order to capture the oil vapor, a plurality of spray nozzles 108 apply a cooling oil mist 110 to the upper surface of the mesh 96. In the embodiment shown, the mesh 96 is arranged in a tepee fashion requiring two banks of spray nozzles 108 on either side of the oil bath filter 90. The oil supplied to the sprayers 108 is preferably drawn by a pump 112 from a lower reservoir 111 of the housing 98 through a pipe 113. The hot oil is then directed through a heat exchanger 116 before being piped to the sprayers 108. The mesh 96 preferably comprises a tangled array of twisted aluminum having a thickness of between 2 and 2-½ inches. Such meshes are similar to those used as grease filters in the exhaust hoods over large cooking stoves. A spigot 118 is provided to maintain the level of liquid oil on the bottom of the housing 98 at a preferred height.

The cooling oil mist 110 helps filter out the oil vapor in two ways. First, the twisted aluminum of the mesh 96 is wetted by the oil mist 110, which causes oil vapor to adhere to the oil coated mesh and thus condense out. Furthermore, the cooling action of the oil mist 110 causes the oil vapor to self-condense due to a temperature drop. Regardless of the mechanism, the oil vapor is substantially filtered from the gaseous by-products of the burn chamber 40 combustion process and drips directly down to the lower portion of the housing 98 or down the side walls. An additional benefit of the oil bath filter 90 is the capture of substantially all of the fly ash present in the gaseous by-products thus eliminating the need for further fly ash scrubbing equipment downstream.

After passing through the oil bath filter 90, the remaining gaseous hydrocarbon by-products pass through the upper flue 104 and into a first combustion chamber, shown diagrammatically at 120 in FIG. 1. The exhaust flow from the oil bath filter substantially comprises gaseous hydrocarbons 94 and is directed into the first combustion chamber 120 whose effluent 121 contains a high proportion of carbon black. The carbon black is filtered from the first combustion chamber emissions and reclaimed for later use, as indicated at 123. The means for capturing the carbon black are known and may comprise, for example, membrane filters, screens or simple baffle surfaces on which the carbon black adheres to and is continually scraped clean. Subsequently, the effluent 121 from the first combustion chamber 120 passes into a second combustion chamber 125 for the purpose of completely combusting the gases resulting to obtain usable heat 126. To assist the complete combustion, oil recovered in the oil bath filter 90 may be atomized and added to the gas stream, as shown by the dashed line 127, to increase the level of combustion and thus promote cleaner burning. The emissions from the second combustion chamber 125 are channeled through a conventional C02 scrubber 124 to produce relatively clean final emissions 129.

Rather than immediately utilizing the high energy emissions from the first combustion chamber 120, the fuel gas may be stored in a tank or bladder. This may require an additional compressor (not shown) to propel the gas along a delivery pipe. Advantageously, substantially all of the oil and fly ash has been removed by the oil bath filter 90 which greatly extends the operational life between maintenance of conventional compressors. Also, the absence of such contaminants in the emissions removes the hassle and expense of cleaning up sludge typically formed at the bottom of industrial bladders from such unwanted matter.

Figure 7:
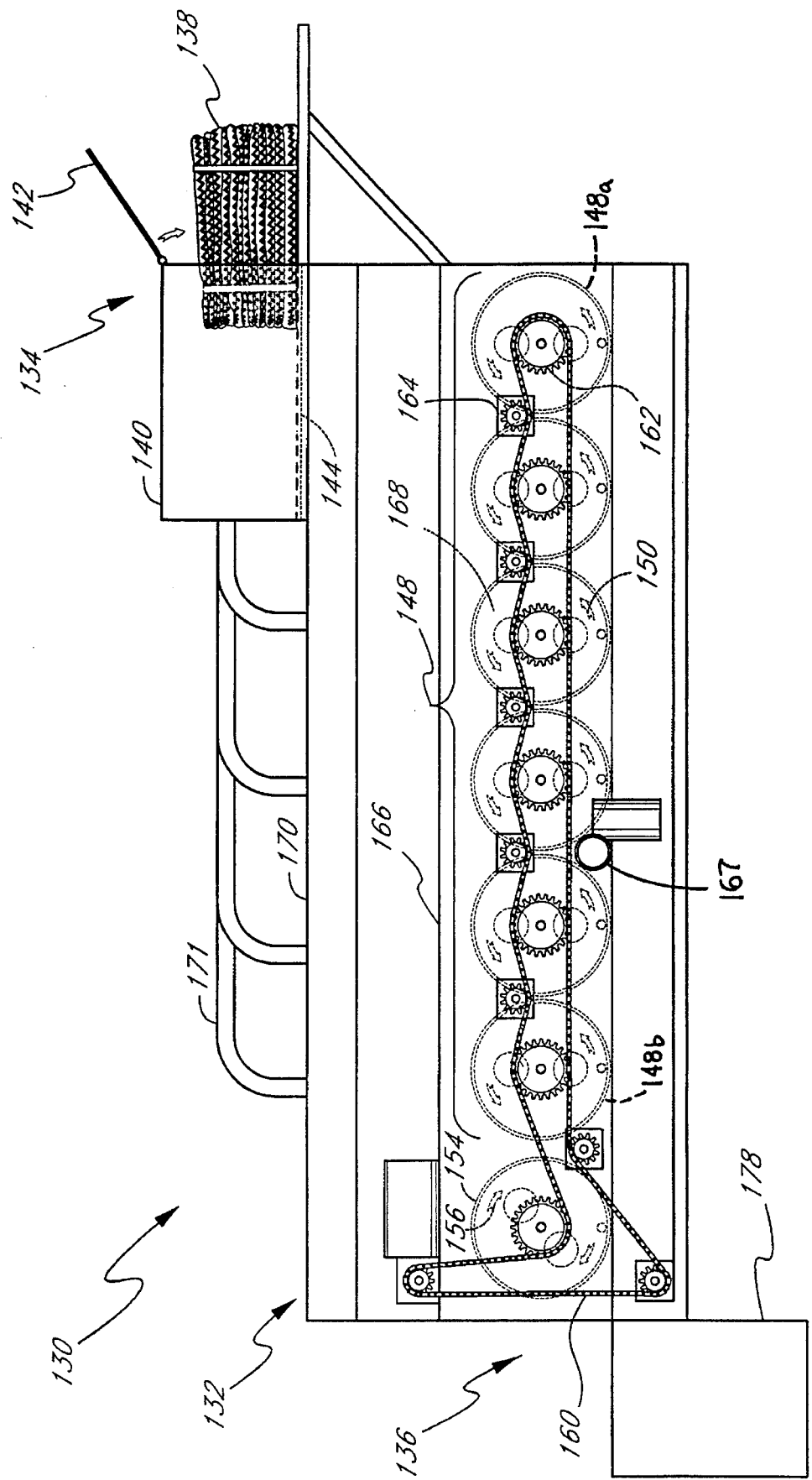
FIG. 7 is a front elevational view of a multiple roller burn chamber of the present invention.
Figure 8:
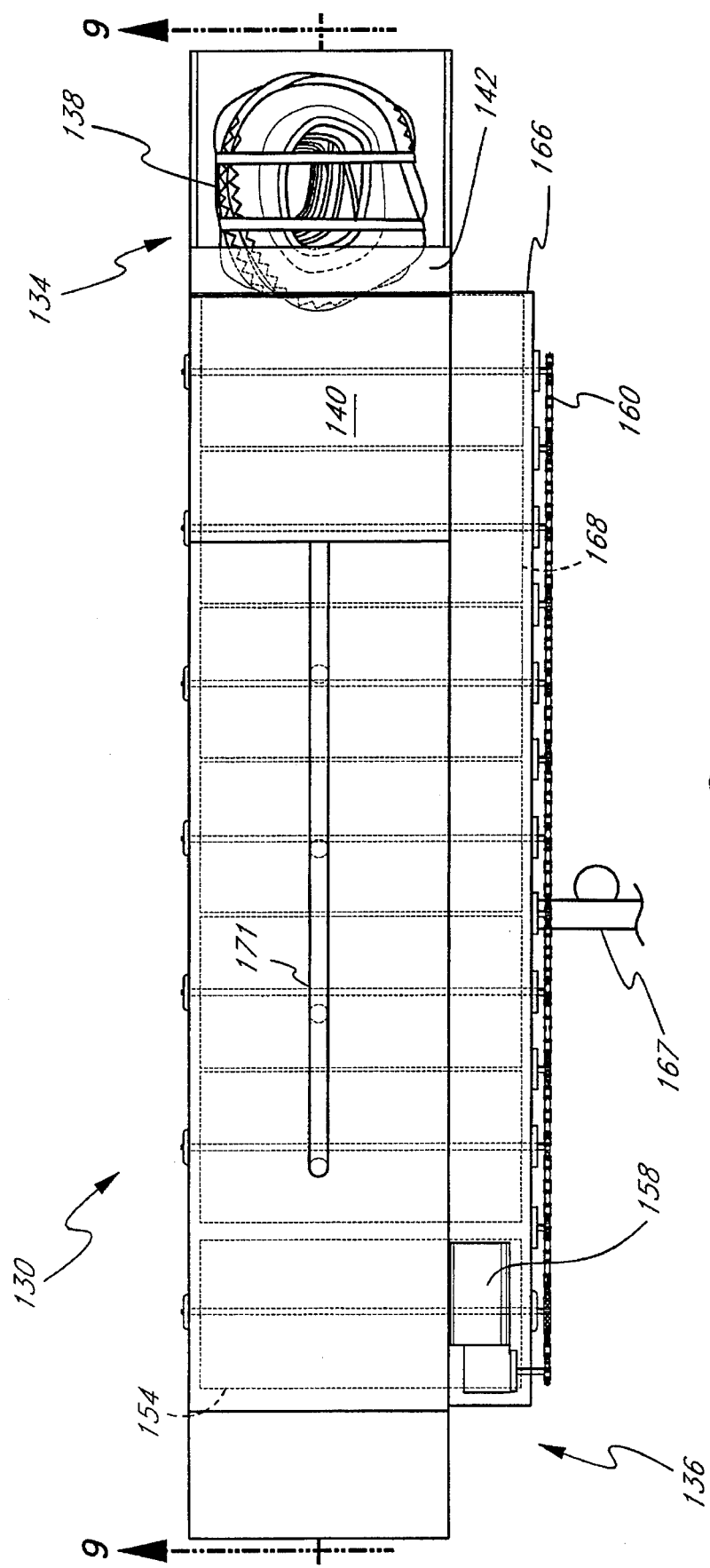
FIG. 8 is a top plan view of the multiple roller burn chamber of FIG. 7.
Figure 9:
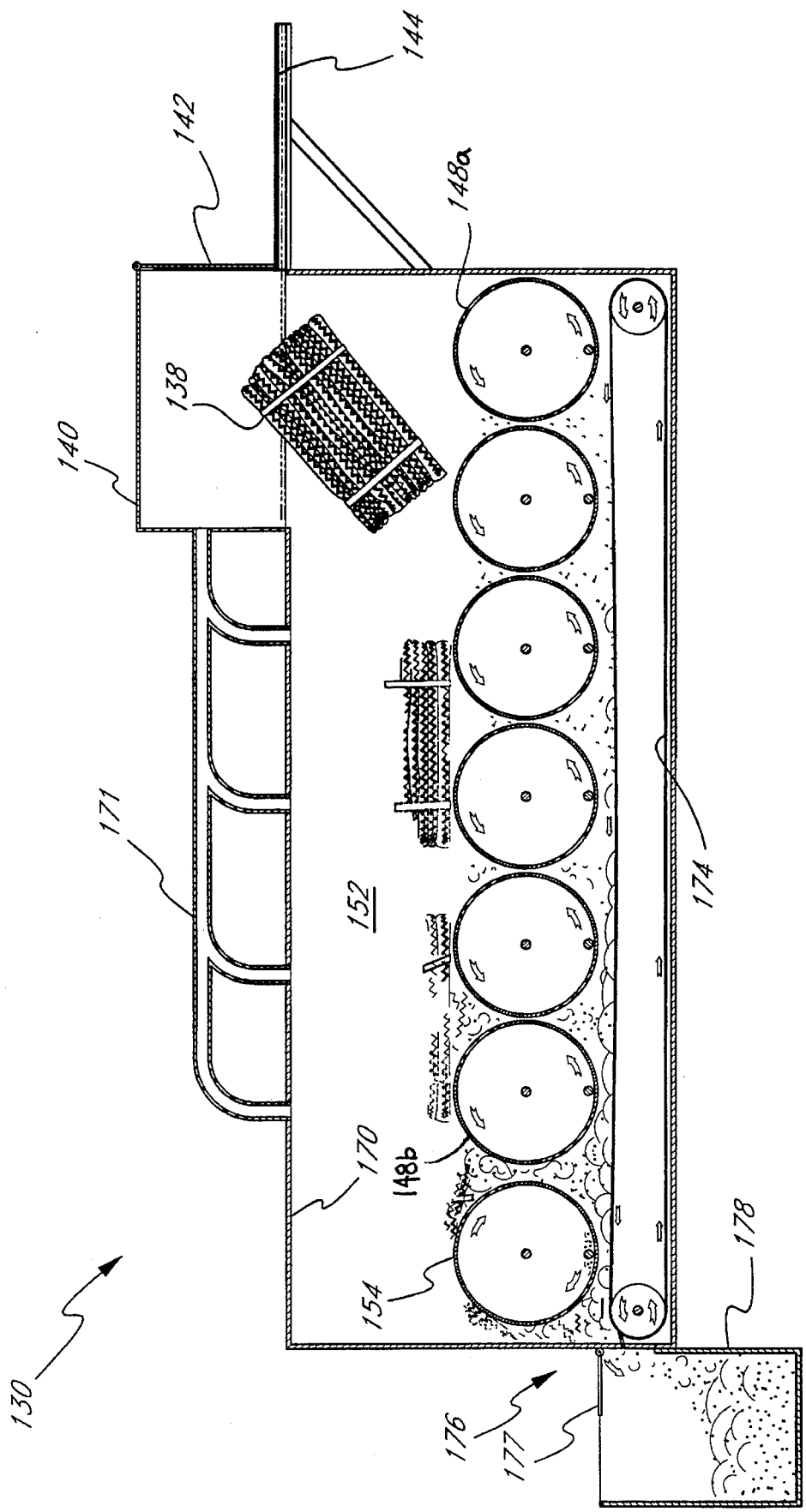
FIG. 9 is a cross-sectional view of the multiple roller burn chamber of taken along line 9—9 of FIG. 8.

Now referring to FIGS. 7 and 8, a multiple roller burn unit 130 is shown. The multiple roller unit 130 generally comprises an elongated housing 132 having a tire inlet end 134 and a solid waste recovery end 136. Tires, such as the wire-wrapped bundle 138, are deposited within an airlock 140, similar to the previously described airlock 28, through a trap door 142. After the trap door 142 is closed, a sliding plate 144 is retracted to drop the tire bundle 138 onto the right end of a series of rollers 148 lying side-by-side and all rotating in the same direction, as indicated by arrows 150. Thus, the bundle of tires 138 is propelled along the length of the burn unit 130 within a progressive burn chamber 152 generally from a first roller 148a to a penultimate roller 148b, as seen in FIG. 9. At the end of the series of rollers 148, a last roller 154 rotates in the opposite direction, as shown by the arrow 156. All but the final two rollers are positioned so that their exterior surfaces nearly touch, the penultimate 148b and last roller 154 being spaced apart a certain distance in order to allow solid waste material from the incomplete combustion process to drop therebetween, as was described for the rollers 24 in the embodiment of FIGS. 2 and 3. The rollers are rotated by a drive train comprising of a motor 158, a chain 160, a series of sprockets 162 keyed to central shafts of the rollers, and a plurality of idler sprockets 164 maintaining chain wrap around the roller sprockets.

As was described for the first embodiment of FIGS. 2 and 3, the multiple roller burn unit 130 includes a front vacuum sub-chamber 166 in which the front plates 168 of each of the rollers in series terminate. One or more vacuum conduits, such as at 167, communicate with the interior of the sub-chamber 166 to vent combustion gases and direct them into the oil bath filter 90 shown in FIGS. 5 and 6. The subsequent processing of the gaseous by-products of the incomplete combustion within the burn unit 130 is identical to that described for the dual roller unit 22 of FIGS. 2 and 3.

Now with reference to FIG. 9, combustion air is pulled in through a ceiling 170 of the unit 130 via a plurality of intake manifolds 171 attached to and communicating with the airlock 140. Thus, as a series of tire bundles 138 smolders along the tops of the rollers 148, 154, the combustion by-products are pulled in through the slits (not shown) in the rollers and into the vacuum sub-chamber 166. As the tire bundles 138 progress along the roller line, any small particulate refuse may drop into or between the rollers and onto a conveyor 174. The majority of now inert solid combustion by-products, such as sulfur-coated wire, falls through a gap between the penultimate and last roller 154 onto the conveyor 174. The advantage of providing an elongated burn chamber 154 lies in the progressive character of the refuse combustion. Specifically, as tires 138 gradually combust and disintegrate they are moved along the series of rollers 148 to make space for fresh tire bundles dropped from the airlock 140. Further, the amount of gaseous by-products produced is partially dependent on the number of perforated rollers 148 and thus the total volume of useful components recovered is increased by the multiple roller unit 130.

The conveyor 174 travels the length of the unit 130 and terminates at a secondary airlock 176. The secondary airlock 176 includes a door 177 proximate the terminal end of the conveyor, which remains closed a majority of the time. Periodically, the door is opened and the conveyor 174 rotated to deposit whatever solid waste has dropped onto the conveyor from the combustion process into a removal bin 178. This process occurs relatively rapidly to minimize the amount of combustion gases escaping into the secondary airlock 176. The resulting solid mass within the removal bin 178 may then be hauled away, and reused or disposed of appropriately.

The present invention solves one dangerous problem with prior incinerators and pyrolysis chambers by maintaining a slightly reduced pressure within the nominally air-tight burn chamber. This reduces the possibility of catastrophic over-pressurization. Furthermore, the low temperature burn ensures a high proportion of oil and carbon black will be reclaimed as opposed to prior systems which initially incinerate the tires at temperatures well over 1000° F. thus causing a more complete combustion reaction. Finally, the emphasis on reclaiming oil and carbon black greatly increases the return on investment as opposed to heat generation systems. The BTU content of tires is relatively low and thus many tires have to burn for even modest energy generation. In contrast, approximately one quart of oil and one-half pound of carbon black can be recovered per tire using the present system. The carbon black alone can then be resold for four dollars a pound at current prices.

The present recycling system 20 is designed to effectively process other difficult to dispose of waste such as oil spill tarpaulins, conveyor belts, shop waste, oily rags, etc. The advantageous roller support for the burning matter continually carries away solid burn by-products while ensuring an even air flow within the combustion region. In general, the recycling system is best suited for waste which combines organic matter such as oil or rubber with inorganic non-volatile components.

Although this invention has been described in terms of certain preferred embodiments, other embodiments that are apparent to those of ordinary skill in the art are also within the range of this invention. Accordingly, the scope of the invention is intended to be defined only by reference to the claims.

What is claimed is:

1. A recycling system for tires or other waste, comprising:

a burn unit having a chamber adapted to accept said waste;

at least one roller in said chamber on which said waste is supported while being partially combusted, said at least one roller being a hollow perforated member and having at least one gas aperture therein; and a source of vacuum in communication with said at least one gas aperture in each roller providing a reduced pressure to the interior of the rollers for drawing gaseous by-products of the partial combustion of the waste within the chamber downward from the combustion area through the rollers and out the gas apertures.

2. The system of claim 1, wherein each said roller includes a plurality of longitudinal slits around the circumference thereof.

3. The system of claim 1, wherein the system comprises at least two rollers and wherein two of said rollers are rotatably mounted to said burn unit and define a gap therebetween through which solid by-products of the partial combustion process drop.

4. The system of claim 3, additionally comprising:

a solid by-products removal receptacle positioned below said rollers having an access door and a structure for substantially closing off said receptacle from said chamber while said receptacle is emptied during operation of said burn unit, so as to prevent a large amount of gaseous by-products from escaping said chamber or a large amount of outside air from entering said chamber.

5. The system of claim 3, wherein said two rollers are rotatable to facilitate the descent of said solid by-products through said gap.

6. The system of claim 5, wherein said rollers include central shafts having at least one end extending outside of said chamber on which sprockets are mounted, and said burn unit further includes a chain drive having a motor and a chain for rotating said rollers via said sprockets.

7. The system of claim 3, additionally comprising:

an air lock for inputting waste to the burn unit during operation of said unit which prevents large amounts of gaseous by-products from escaping said chamber or a large amount of outside air from entering said chamber while inputting waste.

8. The system of claim 7, additionally comprising:

one or more air intake tubes providing communication between said air lock and a region within said chamber proximate said rollers.

9. The system of claim 3, wherein the system comprises at least three rollers and wherein said at least three rollers are aligned in series and at least two of said rollers are spaced apart to define said gap.

10. The system of claim 9, wherein said waste is dropped on a first of said rollers adapted to rotate in a first direction, and subsequently transferred to a last of said rollers, said last roller adapted to rotate in a second direction opposite to said first direction.

11. The system of claim 10, wherein said last roller is aligned next to a penultimate of said rollers and spaced apart to define said gap.

12. The system of claim 1, additionally comprising:

a vacuum sub-chamber enclosing one end of the rollers; and a conduit leading from the vacuum sub-chamber, wherein said vacuum source creates said reduced pressure in the conduit and the vacuum sub-chamber to draw the gases of combustion through the gas apertures.

13. The system of claim 12, additionally comprising:

a second conduit and a second vacuum source, said second conduit providing direct communication between said vacuum sub-chamber and said chamber so that actuation of said second vacuum source draws gaseous by-products from said sub-chamber into said chamber to be re-burned.

14. The system of claim 13, wherein said first and said second vacuum sources comprise variable speed blowers and said system includes one or more sensors for monitoring one or more output conditions of said partial combustion, said output conditions being useful for adjusting the speed of one or both of said blowers to correct said output conditions to a desired state.

15. The system of claim 1, additionally comprising:

an oil bath filter into which the gaseous by-products of the partial combustion in the chamber are directed, said oil bath filter having a housing and an oil vapor entrapment screen mounted in said housing between an entrance aperture and an exit flue in order to cause said gaseous by-products to filter through said screen to trap and condense oil vapor thereon.

16. The system of claim 15, wherein said oil bath filter further comprises:

at least one spray nozzle mounted to said housing above said screen;

a reservoir under said screen for collecting oil which condenses on said screen;

an oil cooler outside of said housing;

an oil pump; and a piping system interconnecting said reservoir, said pump, said cooler and said nozzle so that oil is pumped from said reservoir through said cooler and to said spray nozzle and applied to the upper surface of said screen as a mist.

17. The system of claim 15, additionally comprising:

a first combustion chamber for partially burning emissions from the exit flue of said oil bath filter to produce an effluent high in carbon black in order to facilitate collection of said carbon black.

18. The system of claim 17, additionally comprising:

a second combustion chamber for completely combusting the effluent from the first combustion chamber after substantially all of the carbon black has been removed therefrom.

19. The system of claim 1, additionally comprising:

an ignition system having a source of flammable gas, a delivery hose and a spark plug, the spark plug being located to ignite a flow of said flammable gas and said waste when energized.

20. A method of recycling useable components from tires or other waste, comprising the steps of:

supporting the waste on top of at least one circumferentially perforated hollow member rotatably mounted within a burn unit;

burning the waste in an incomplete combustion process to form a gaseous by-product and a solid by-product;

rotating said hollow member;

creating a reduced pressure within said hollow member to draw said gaseous by-product into said member through said circumferential perforations; and conducting said gaseous by-product out of said burn unit to separate the gaseous and solid by-products of said partial combustion.

21. A method of recycling useable components from tires or other waste, comprising the steps of:

supporting the waste on top of at least two perforated hollow members rotatably mounted within a burn unit and spaced apart to define a gap;

burning the waste in an incomplete combustion process to form a gaseous by-product and a solid by-product;

rotating said members to urge the solid by-products of the incomplete combustion to fall through said gap;

creating a reduced pressure within said hollow member to draw said gaseous by-product into said members; and conducting said gaseous by-product out of said burn unit to separate the gaseous and solid by-products of said partial combustion.

22. The method of claim 21, wherein said burn unit comprises at least three members, said at least three members comprising a first roller, a penultimate roller and a last roller, said last roller and said penultimate roller spaced apart to define said gap and said rollers rotatably mounted to said burn unit and aligned in series, wherein said method further comprises:

rotating said first of said rollers in a first direction;

rotating said last of said rollers in a second direction opposite to said first direction rotation;

depositing said waste on said first roller;

transferring said waste to said last roller, so that waste is propelled toward said gap to provide a progressive burn.

23. A method of recycling useable components from tires or other waste, comprising the steps of:

supporting the waste on top of at least one perforated hollow member within a burn unit;

burning the waste in an incomplete combustion process to form a gaseous by-product and a solid by-product;

creating a reduced pressure within said hollow member to draw said gaseous by-product into said member;

conducting said gaseous by-product out of said burn unit to separate the gaseous and solid by-products of said partial combustion;

blowing said gaseous by-product from said burn unit through an entrance aperture of an oil condenser having a screen interposed between said entrance aperture and an exit flue; and spraying oil at a lower temperature than said gaseous by-product on an upper surface of said screen to facilitate condensation of oil vapor within said gaseous by-product on said screen.

24. The method of claim 23, further comprising the steps of:

directing said gaseous by-product from said oil condenser into a combustion chamber;

partially combusting said gaseous by-product to produce an effluent having a high concentration of carbon black; and collecting said carbon black.

25. A method of recycling useable components from tires or other waste, comprising the steps of:

supporting the waste on top of at least one perforated hollow member within a burn unit;

burning the waste in an incomplete combustion process to form a gaseous by product and a solid by-product;

creating a reduced pressure within said hollow member to draw said gaseous by-product into said member;

conducting said gaseous by-product out of said burn unit to separate the gaseous and solid by-products of said partial combustion wherein said waste comprises metal wires and inorganic matter that includes sulphur and zinc, wherein said sulphur and zinc are deposited on said wires, and wherein said method further comprises collecting said wires with sulphur and zinc deposited thereon.

26. A waste recycling system, comprising:

a burn unit having a chamber in which used tires or other waste are supported on top of at least one perforated hollow member and partially combusted to form a gaseous by-product and a solid by-product, said hollow member having a reduced pressure within to draw said gaseous by-product downward from said combusting waste;

an oil bath filter into which the gaseous by-products of the partial combustion in the chamber are directed, said oil bath filter having a housing and an oil vapor entrapment screen mounted in said housing between an entrance aperture and an exit flue in order to cause said gaseous by-products to filter through said screen to trap and condense oil vapor thereon, said oil bath filter comprising:

at least one spray nozzle mounted to said housing above said screen;

a reservoir under said screen for collecting oil which condenses on said screen;

an oil cooler outside of said housing;

an oil pump; and a piping system interconnecting said reservoir, said pump, said cooler and said nozzle so that oil is pumped from said reservoir through said cooler and to said spray nozzle and applied to the upper surface of said screen as a mist.

* * * * *